United States Patent [19]
Heskett et al.

[11] Patent Number: 5,908,233
[45] Date of Patent: Jun. 1, 1999

[54] AUTO RECHARGEABLE FLASHLIGHT

[76] Inventors: Bryon Kenneth Heskett, deceased, late of Simcoe, Canada; Nazare Lopes Heskett, executor; Tony Rodrigues, executor, both of RR. #7, Simcoe, Ontario, Canada, N3Y 4K6

[21] Appl. No.: 08/978,943

[22] Filed: Nov. 26, 1997

[51] Int. Cl.⁶ ....................................................... F21L 7/00
[52] U.S. Cl. .......................... 362/183; 362/486; 362/488; 362/542; 320/107; 320/114
[58] Field of Search ..................................... 362/183, 486, 362/488, 542, 540; 320/107, 114, 115, 160, 125; D13/107

[56] References Cited

U.S. PATENT DOCUMENTS 4,463,283  7/1984  Penney et al. ............................ 362/183

*Primary Examiner*—Sandra O'Shea
*Assistant Examiner*—Todd Reed Hopper

[57] ABSTRACT

A AUTO RECHARGEABLE FLASHLIGHT is provided with a base having a weight coupled to a bottom face thereof. At least one recess is formed in a top face of the base with such recess having a pair of contacts situated on an inner side wall thereof. Further provided is a power cord having a first end coupled to the periphery of the base and a second end having a vehicle cigarette lighter adapter designed to be releasably plugged within a vehicle cigarette lighter socket for receiving power therefrom. The first end of the cord is connected to the contacts for supplying power to appliances to be recharged.

9 Claims, 2 Drawing Sheets

AUTO RECHARGEABLE FLASHLIGHT

BACKGROUND OF THE INVENTION

1. Field of the Invention

The present invention relates to battery chargers and more particularly pertains to a new auto automotive rechargeable flashlight for recharging modular battery packs within a vehicle.

2. Description of the Prior Art

The use of battery chargers is known in the prior art. More specifically, battery chargers heretofore devised and utilized are known to consist basically of familiar, expected and obvious structural configurations, notwithstanding the myriad of designs encompassed by the crowded prior art which have been developed for the fulfillment of countless objectives and requirements.

Known prior art battery chargers include U.S. Pat. No. 4,638,236; U.S. Pat. No. 4,540,929; U.S. Pat. No. Des. 349,096; U.S. Pat. No. Des. 349,096; U.S. Pat. No. Des. 336,281; U.S. Pat. No. Des. 278,703; and U.S. Pat. No. 4,786,703.

In these respects, the automotive rechargeable flashlight according to the present invention substantially departs from the conventional concepts and designs of the prior art, and in so doing provides an apparatus primarily developed for the purpose of recharging modular battery packs within a vehicle.

SUMMARY OF THE INVENTION

In view of the foregoing disadvantages inherent in the known types of battery chargers present in the prior art, the present invention provides a new automotive rechargeable flashlight construction wherein the same can be utilized for recharging modular battery packs within a vehicle.

The general purpose of the present invention, which will be described subsequently in greater detail, is to provide a new automotive rechargeable flashlight apparatus and method which has many of the advantages of the battery chargers mentioned heretofore and many novel features that result in a new automotive rechargeable flashlight which is not anticipated, rendered obvious, suggested, or even implied by any of the prior art battery chargers, either alone or in any combination thereof.

To attain this, the present invention essentially comprises a base having a rectilinear configuration with a top face, a bottom face, and a periphery formed therebetween defining an interior space. As shown in FIG. 1, the base has a rectangular weighted plate coupled to the bottom face thereof. Such weighted plates aids in precluding movement of the base when positioned on a floor of a vehicle. Formed in the top face of the base is a first rectangular recess. The first rectangular recess has a first size and a pair of contacts situated on an inner side wall thereof. Associated therewith is a second rectangular recess formed in the top face of the base adjacent the first rectangular recess. The second rectangular recess has a second size unequal to the first size. The second rectangular recess further includes a pair of contacts situated on an inner side wall thereof. Next provided is a power cord having a first end coupled to the periphery of the base with a grommet situated thereon. A second end of the cord has a vehicle cigarette lighter adapter designed to be releasably plugged within a vehicle cigarette lighter socket for receiving power therefrom. A voltage adjuster is situated within the base and connected between the power cord and the contacts. In use, the voltage adjuster is adapted for stepping down a voltage received from the power cord one of a plurality of discrete levels. By this design, a stepped down voltage is applied to the contacts. The voltage adjuster further includes a dial positioned on the top face of the base for allowing the manual selection of which discrete level the voltage received from the power cord is stepped down. As best shown in FIG. 3, a circuit breaker is provided to protect the various electrical components of the present invention. Such circuit breaker is situated within the base and is connected between the power cord and the voltage adjuster. The circuit breaker removes a connection between the forgoing components upon a current flow being present that exceeds a predetermined amount. The circuit breaker further includes a reset button located on the top face of the housing. Such button reestablishes the aforementioned connection upon the depression thereof. To indicate proper receipt of power from the power cord and vehicle, a light emitting diode is connected between the circuit breaker and the voltage adjuster. Also included is a voltage meter connected in parallel with at least one of the pairs of contacts. The voltage meter functions to indicate a voltage present across the contacts. Finally, a rechargeable flash light is provided having a generally rectilinear configuration. A size of the flash light corresponds to the first size. As shown in FIGS. 1 & 4, the flash light includes a light bulb located on a top end thereof, a rechargeable battery located therewithin, and a switch positioned on a side face thereof. The switch is connected between the battery and bulb for allowing the selective actuation thereof. It should be noted that the flash light further has a pair of contacts positioned on a bottom end thereof and connected in parallel with the battery thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new automotive rechargeable flashlight apparatus and method which has many of the advantages of the battery chargers mentioned heretofore and many novel features that result in a new automotive rechargeable flashlight which is not anticipated, rendered obvious, suggested, or even implied by any of the prior art battery chargers, either alone or in any combination thereof.

It is another object of the present invention to provide a new automotive rechargeable flashlight which may be easily and efficiently manufactured and marketed.

It is a further object of the present invention to provide a new automotive rechargeable flashlight which is of a durable and reliable construction.

An even further object of the present invention is to provide a new automotive rechargeable flashlight which is susceptible of a low cost of manufacture with regard to both materials and labor, and which accordingly is then susceptible of low prices of sale to the consuming public, thereby making such automotive rechargeable flashlight economically available to the buying public.

Still yet another object of the present invention is to provide a new automotive rechargeable flashlight which provides in the apparatuses and methods of the prior art some of the advantages thereof, while simultaneously overcoming some of the disadvantages normally associated therewith.

Still another object of the present invention is to provide a new automotive rechargeable flashlight for recharging modular battery packs within a vehicle.

Even still another object of the present invention is to provide a new automotive rechargeable flashlight that includes a base having a weight coupled to a bottom face thereof. At least one recess is formed in a top face of the base with such recess having a pair of contacts situated on an inner side wall thereof. Further provided is a power cord having a first end coupled to the periphery of the base and a second end having a vehicle cigarette lighter adapter designed to be releasably plugged within a vehicle cigarette lighter socket for receiving power therefrom. The first end of the cord is connected to the contacts for supplying power to appliances to be recharged.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
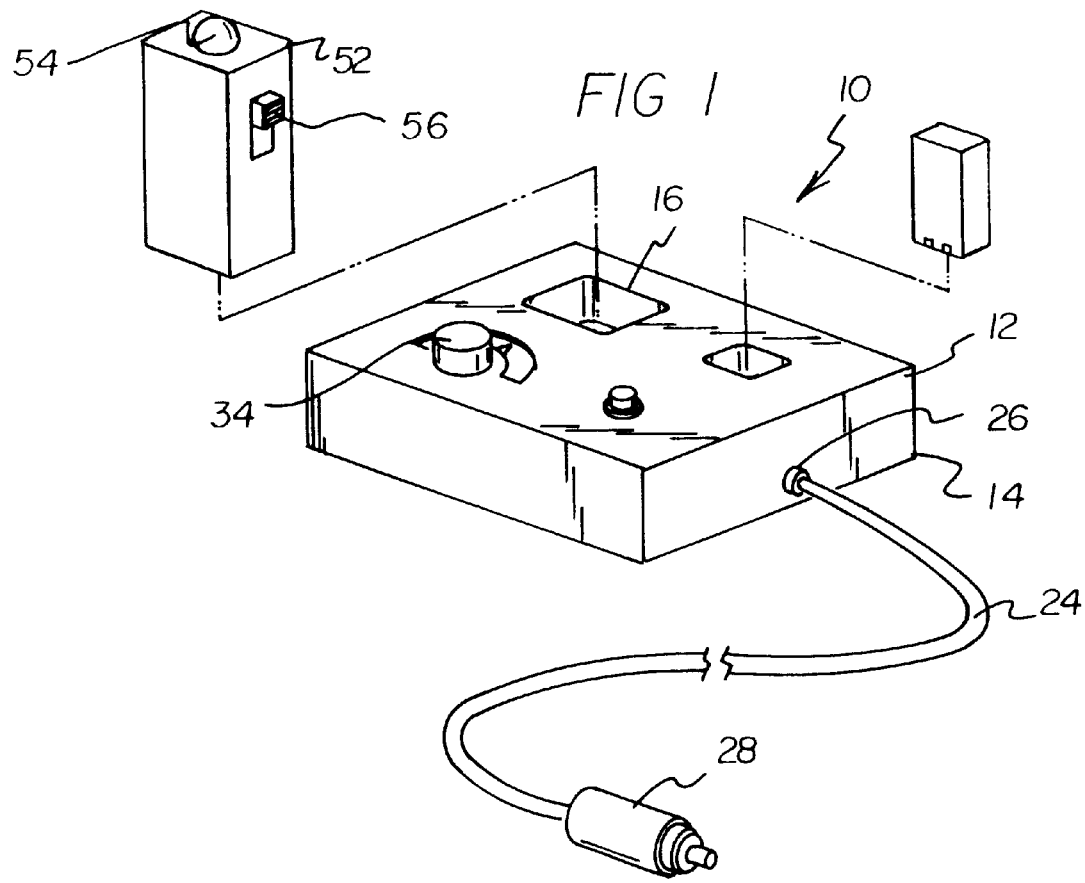
FIG. 1 is a perspective illustration of a new automotive rechargeable flashlight according to the present invention.
Figure 2:
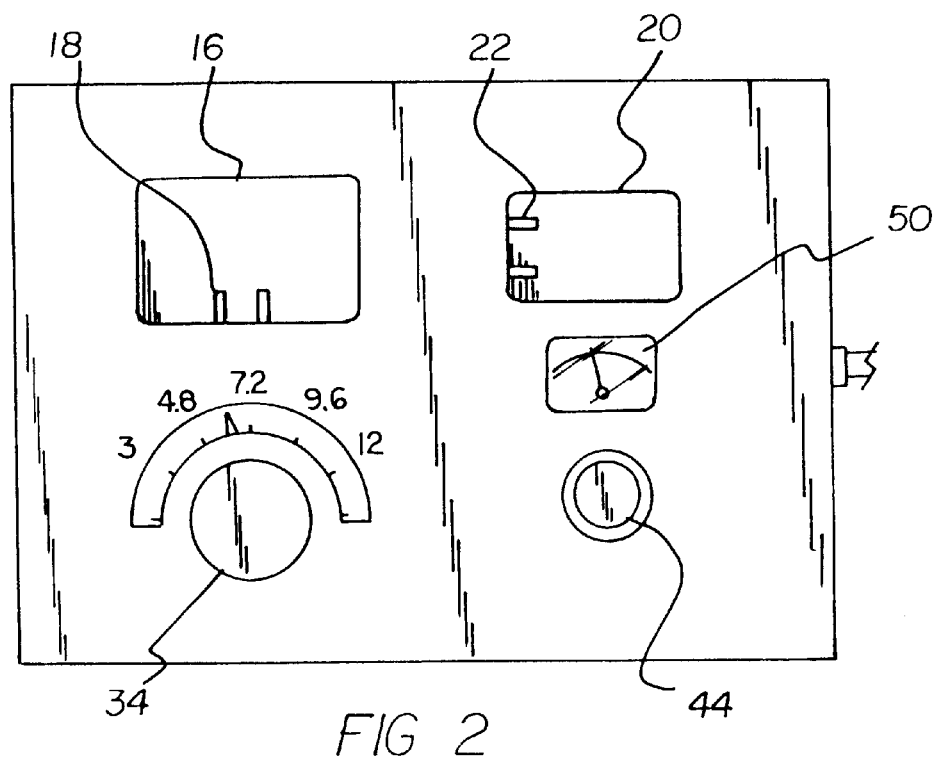
FIG. 2 is a top view of the present invention.

With reference now to the drawings, a new automotive rechargeable flashlight embodying the principles and concepts of the present invention and generally designated by the reference numeral 10 will be described.

More specifically, it will be noted that the system 10 of the present invention includes a base 12 having a rectilinear configuration with a top face, a bottom face, and a periphery formed therebetween defining an interior space. As shown in FIG. 1, the base has a rectangular weighted plate 14 coupled to the bottom face thereof. Such weighted plate aids in precluding movement of the base when positioned on a floor of a vehicle.

Formed in the top face of the base is a first rectangular recess 16. The first rectangular recess has a first size and a pair of contacts 18 situated on an inner side wall thereof. Associated therewith is a second rectangular recess 20 formed in the top face of the base adjacent the first rectangular recess. The second rectangular recess has a second size unequal to the first size. The second rectangular recess further includes a pair of contacts 22 situated on an inner side wall thereof.

Next provided is a power cord 24 having a first end coupled to the periphery of the base with a grommet 26 situated thereon. A second end of the cord has a vehicle cigarette lighter adapter 28 designed to be releasably plugged within a vehicle cigarette lighter socket for receiving power therefrom.

Figure 3:
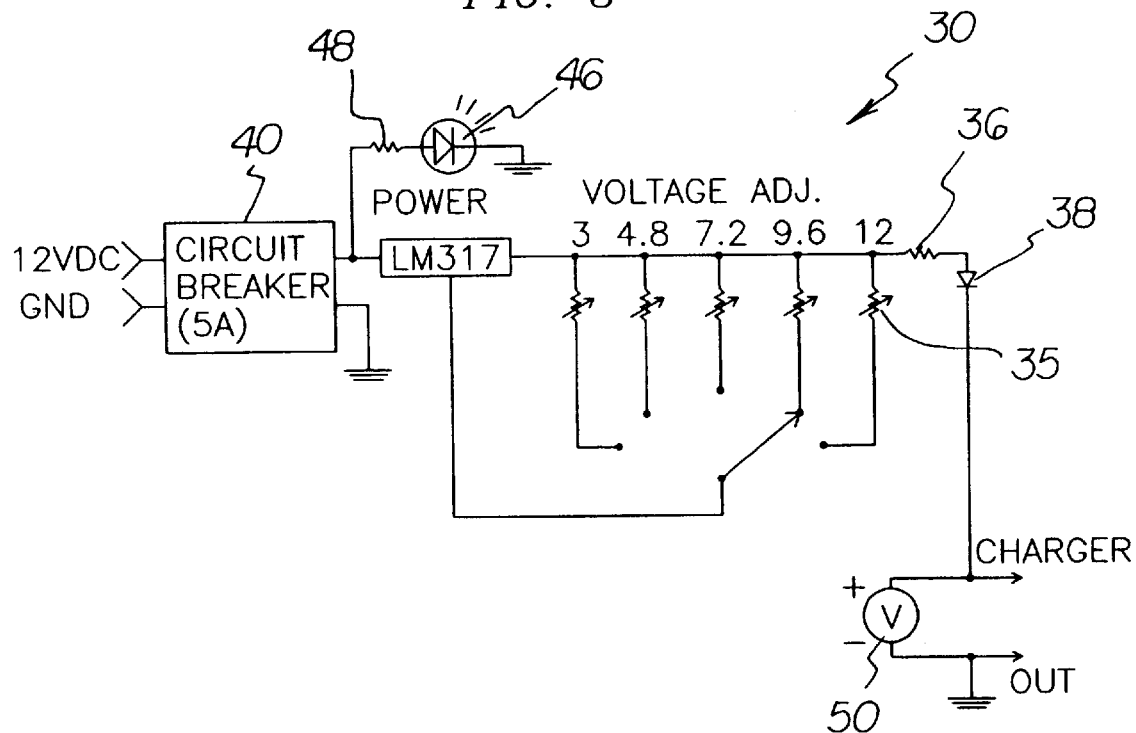
FIG. 3 is a schematic diagram of the circuitry within the base of the present invention.

A voltage adjuster 30 is situated within the base and connected between the power cord and the contacts. In use, the voltage adjuster is adapted for stepping down a voltage received from the power cord one of a plurality of discrete levels. By this design, stepped down voltages of various levels may be applied to the contacts. The voltage adjuster further includes a dial 34 positioned on the top face of the base for allowing the manual selection of which discrete level the voltage received from the power cord is stepped down. As shown in FIG. 3, the voltage adjuster preferably comprises a plurality of different resistors or potentiometers 35 which may be selectively connected in series with a common resistor 36 and diode 38 for providing a reduced voltage by way of voltage division. As shown in FIG. 3, the various voltages include 2 V, 4.8 V, 7.2 V, 9.6 V & 12 V.

As best shown in FIG. 3, a circuit breaker 40 is provided to protect the various electrical components of the present invention. Such circuit breaker is situated within the base and is connected between the power cord and the voltage adjuster. The circuit breaker removes a connection between the forgoing components upon a current flow being present that exceeds a predetermined amount. En the preferred embodiment, such amount is 5 Amps. The circuit breaker further includes a reset button 44 located on the top face of the housing. Such button reestablishes the aforementioned connection upon the depression thereof.

To indicate proper receipt of power from the power cord and vehicle, a light emitting diode 46 is connected between the circuit breaker and the voltage adjuster. The diode is equipped with a current limiting resistor 48 to prevent the diode from overloading. Also included is a voltage meter 50 connected in parallel with at least one of the pairs of contacts. The voltage meter functions to indicate a voltage present across the contacts.

Figure 4:
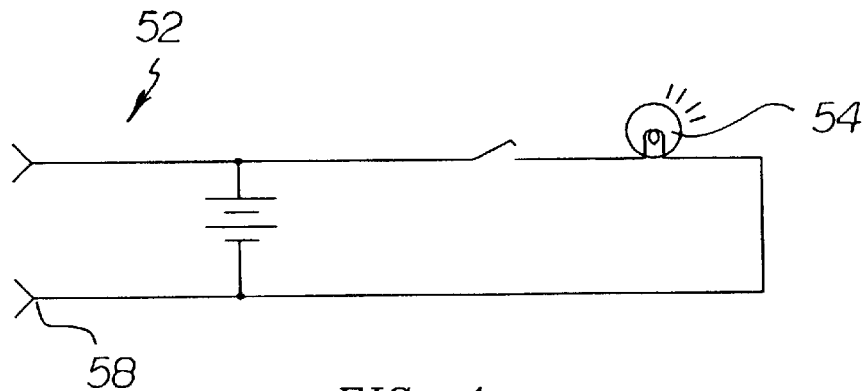
FIG. 4 is a schematic diagram of the rechargeable flash light of the present invention.

Finally, a rechargeable flash light 52 is provided having a generally rectilinear configuration. A size of the flash light corresponds to the first size. As shown in FIGS. 1 & 4, the flash light includes a light bulb 54 located on a top end thereof, a rechargeable battery located therewithin, and a switch 56 positioned on a side face thereof. The switch is connected between the battery and bulb for allowing the selective actuation thereof. It should be noted that the flash light further has a pair of contacts 58 positioned on a bottom end thereof and connected in parallel with the battery thereof.

In use, the bottom end of the flash light may be positioned within the first rectangular recess such that the contacts thereof abut those of the recess. Further, other appliances such as tools and the like may be positioned in the second recess for charging. Prior to charging, the voltage across the contacts is set so that recharging of the flash light may be accomplished appropriately.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new and improved automotive rechargeable flashlight system comprising, in combination:

a base having a rectilinear configuration with a top face, a bottom face, and a periphery formed therebetween defining an interior space, the base having a rectangular weighted plate coupled to the bottom face thereof;

a first rectangular recess formed in the top face of the base, the first rectangular recess having a first size and a pair of contacts situated on an inner side wall thereof;

a second rectangular recess formed in the top face of the base adjacent the first rectangular recess, the second rectangular recess having a second size unequal to the first size, the second rectangular recess further having a pair of contacts situated on an inner side wall thereof;

a power cord having a first end coupled to the periphery of the base with a grommet situated thereon and a second end having a vehicle cigarette lighter adapter designed to be releasably plugged within a vehicle cigarette lighter socket for receiving power therefrom;

a voltage adjuster situated within the base and connected between the power cord and the contacts for stepping down a voltage received from the power cord one of a plurality of discrete levels, whereby a stepped down voltage is applied to the contacts, the voltage adjuster further including a dial positioned on the top face of the base for allowing the manual selection at which discrete level the voltage received from the power cord is stepped down;

a circuit breaker situated within the base and connected between the power cord and the voltage adjuster for removing a connection therebetween upon a current flow being present that exceeds a predetermined amount, the circuit breaker further including a reset button located on the top face of the housing for reestablishing the connection upon the depression thereof;

a light emitting diode connected between the circuit breaker and the voltage adjuster for illuminating upon the receipt of power from the power cord;

a voltage meter connected in parallel with at least one of the pairs of contacts for indicating a voltage present across the contacts; and a rechargeable flash light having a generally rectilinear configuration with a size corresponding to the first size, the flash light including a light bulb located on a top end thereof, a rechargeable battery located therewithin, and a switch positioned on a side face thereof, the switch connected between the battery and bulb for allowing the selective actuation thereof, the flash light further having a pair of contacts positioned on a bottom end thereof and connected in parallel with the battery thereof;

whereby the bottom end of the flash light may be positioned within the first rectangular recess such that the contacts thereof abut those of the recess and further the voltage across the contacts may be set so that recharging of the flash light may be accomplished within a vehicle.

2. A recharging system comprising:

a base with a top face, a bottom face, and a periphery formed therebetween defining an interior space;

at least one recess formed in the top face of the base, the recess having a pair of contacts situated on an inner side wall thereof;

a power cord having a first end coupled to the periphery of the base and a second end having a vehicle cigarette lighter adapter designed to be releasably plugged within a vehicle cigarette lighter socket for receiving power therefrom;

a voltage adjuster situated within the base and connected between the power cord and the contacts for stepping down a voltage received from the power cord one of a plurality of discrete levels, whereby a stepped down voltage is applied to the contacts, the voltage adjuster further including a dial positioned on the top face of the base for allowing the manual selection at which discrete level the voltage received from the power cord is stepped down; and a circuit breaker situated within the base and connected between the power cord and the voltage adjuster for removing a connection therebetween upon a current flow being present that exceeds a predetermined amount, the circuit breaker further including a reset button located on the top face of the housing for reestablishing the connection upon the depression thereof;

whereby various appliances may be positioned within the recess such that the contacts thereof abut those of the recess and further the voltage across the contacts may be set appropriately so that recharging of the appliance may be accomplished within a vehicle.

3. A recharging system as set forth in claim 2 and further including a light emitting diode connected between the circuit breaker and the voltage adjuster for illuminating upon the receipt of power from the power cord.

4. A recharging system as set forth in claim 2 and further including a voltage meter connected in parallel with at least one of the pairs of contacts for indicating a voltage present across the contacts.

5. A recharging system as set forth in claim 2 and further including a rechargeable flash light having a generally rectilinear configuration, the flash light including a light bulb located on a top end thereof, a rechargeable battery located therewithin, and a switch positioned on a side face thereof, the switch connected between the battery and bulb for allowing the selective actuation thereof, the flash light further having a pair of contacts positioned on a bottom end thereof and connected in parallel with the battery thereof.

6. A recharging system as set forth in claim 2 wherein a plurality of recesses are formed on the top face of the base each with a different size.

7. A recharging system as set forth in claim 2 wherein the base has a weight coupled to the bottom face thereof.

8. A recharging system comprising:

a base with a top face, a bottom face, and a periphery formed therebetween defining an interior space;

said base having a weight coupled thereto for precluding movement of the base when positioned on a floor of a vehicle;

at least one recess formed in the top face of the base, the recess having a pair of contacts situated therein;

a power cord having a first end coupled to the base and a second end having a vehicle cigarette lighter adapter designed to be releasably plugged within a vehicle cigarette lighter socket for receiving power therefrom, the first end being coupled to the contacts for supplying power thereto, and a voltage meter connected in parallel with the pair of contacts for indicating a voltage present across the contacts.

9. A recharging system as set forth in claim 8 and further including a rechargeable flash light, the flash light including a light bulb located on a top end thereof, a rechargeable battery located therewithin, and a switch positioned on a side face thereof, the switch connected between the battery and bulb for allowing the selective actuation thereof, the flash light further having a pair of contacts positioned on a bottom end thereof and connected in parallel with the battery thereof.

* * * * *